(12) United States Patent
Kiser

(10) Patent No.: US 6,860,701 B2
(45) Date of Patent: Mar. 1, 2005

(54) WHEELCHAIR RAMP WITH SIDE BARRIERS

(75) Inventor: Aaron Kiser, Royal Center, IN (US)

(73) Assignee: The Braun Corporation, Winamac, IN (US)

( * ) Notice: Subject to any disclaimer, the term of this patent is extended or adjusted under 35 U.S.C. 154(b) by 77 days.

(21) Appl. No.: 10/225,693

(22) Filed: Aug. 21, 2002

(65) Prior Publication Data

US 2004/0013507 A1 Jan. 22, 2004

Related U.S. Application Data

(60) Provisional application No. 60/314,275, filed on Aug. 22, 2001.

(51) Int. Cl.[7] .................................................. B60P 1/43
(52) U.S. Cl. ......................... 414/537; 414/522; 414/921
(58) Field of Search ................................ 414/522, 537, 414/546, 921

(56) References Cited

U.S. PATENT DOCUMENTS

| | | |
|---|---|---|
| 4,058,228 A | 11/1977 | Hall |
| 4,134,504 A | 1/1979 | Salas et al. |
| 4,685,858 A | 8/1987 | Manning et al. |
| 4,759,682 A | 7/1988 | Hood |
| 4,778,328 A | 10/1988 | Apgar |
| 4,827,548 A | 5/1989 | Hood |
| 4,850,788 A | 7/1989 | Dickson |
| 4,909,700 A | 3/1990 | Fontecchio et al. |
| 4,950,123 A | 8/1990 | Brockhaus |
| 4,958,979 A | 9/1990 | Svensson |
| 5,110,252 A | 5/1992 | Aoki |
| 5,111,912 A | 5/1992 | Kempf |
| 5,133,634 A | 7/1992 | Gingrich et al. |
| 5,160,236 A | 11/1992 | Redding et al. |
| 5,180,275 A | * 1/1993 | Czech et al. ................ 414/541 |
| 5,186,282 A | 2/1993 | Everhard et al. |
| 5,199,150 A | 4/1993 | Mortenson |

(List continued on next page.)

FOREIGN PATENT DOCUMENTS

| | | |
|---|---|---|
| DE | 41 34 559 A1 | 4/1993 |
| EP | 0 629 524 A1 | 12/1994 |
| EP | 0 446 224 B1 | 1/1996 |
| EP | 0 703 766 B1 | 4/1996 |
| ES | 2 137 856 A1 | 12/1999 |
| GB | 2 224 992 B | 4/1993 |
| WO | WO 99/12506 | 3/1999 |

Primary Examiner—Thomas J Brahan
(74) Attorney, Agent, or Firm—Michael Best & Friedrich LLP

(57) ABSTRACT

An access system for passenger boarding of a vehicle is provided. The access system includes a frame mounted to the vehicle. A ramp is movably mounted in the frame. The ramp is movable with respect to the frame between a stowed position and a deployed position with respect to the vehicle. The ramp includes side barriers extending therealong between an inboard end and an outboard end of the ramp. The side barriers are movable between a stowed orientation and a raised safety barrier orientation by an actuator. The vehicular access system includes a frame positioned below the floor level of a vehicle to which a carriage is moveably mounted. The ramp or transfer member is attached to the carriage by a pivoting rocker assembly. A drive assembly deploys and stows the ramp from the frame. An actuator is moveable between a raised safety barrier orientation and a stowed low-profile orientation with a side barrier that is pivotably mounted and spring biased toward the stowed low-profile orientation. The rocker assembly and actuator are operable with the drive assembly to raise the inboard end of the ramp to the floor level of the vehicle and to pivot the side barrier to the raised safety barrier orientation as the ramp is deployed.

20 Claims, 11 Drawing Sheets

U.S. PATENT DOCUMENTS

| | | |
|---|---|---|
| 5,253,973 A | 10/1993 | Fretwell |
| 5,257,894 A | 11/1993 | Grant |
| 5,305,486 A | 4/1994 | Smith et al. |
| 5,331,701 A | 7/1994 | Chase et al. |
| 5,340,267 A | 8/1994 | Stoll et al. |
| 5,357,869 A | 10/1994 | Barjolle et al. |
| 5,380,144 A | 1/1995 | Smith et al. |
| 5,393,192 A | 2/1995 | Hall et al. |
| 5,556,250 A | 9/1996 | Fretwell et al. |
| 5,636,399 A | 6/1997 | Tremblay et al. |
| 5,676,515 A | 10/1997 | Haustein |
| 5,775,232 A | 7/1998 | Golemis et al. |
| 5,795,125 A | 8/1998 | Walkden |
| 5,815,870 A | 10/1998 | Deutch et al. |
| 5,832,555 A | 11/1998 | Saucier et al. |
| 5,871,329 A | 2/1999 | Tidrick et al. |
| 5,975,830 A | 11/1999 | Goodrich et al. |
| 6,010,298 A | 1/2000 | Cohn et al. |
| 6,039,528 A | 3/2000 | Cohn |
| 6,102,648 A | 8/2000 | Fretwell et al. |
| 6,264,416 B1 | 7/2001 | Eaton, Jr. |
| 6,309,170 B1 * | 10/2001 | Vartanian .................... 414/546 |

* cited by examiner

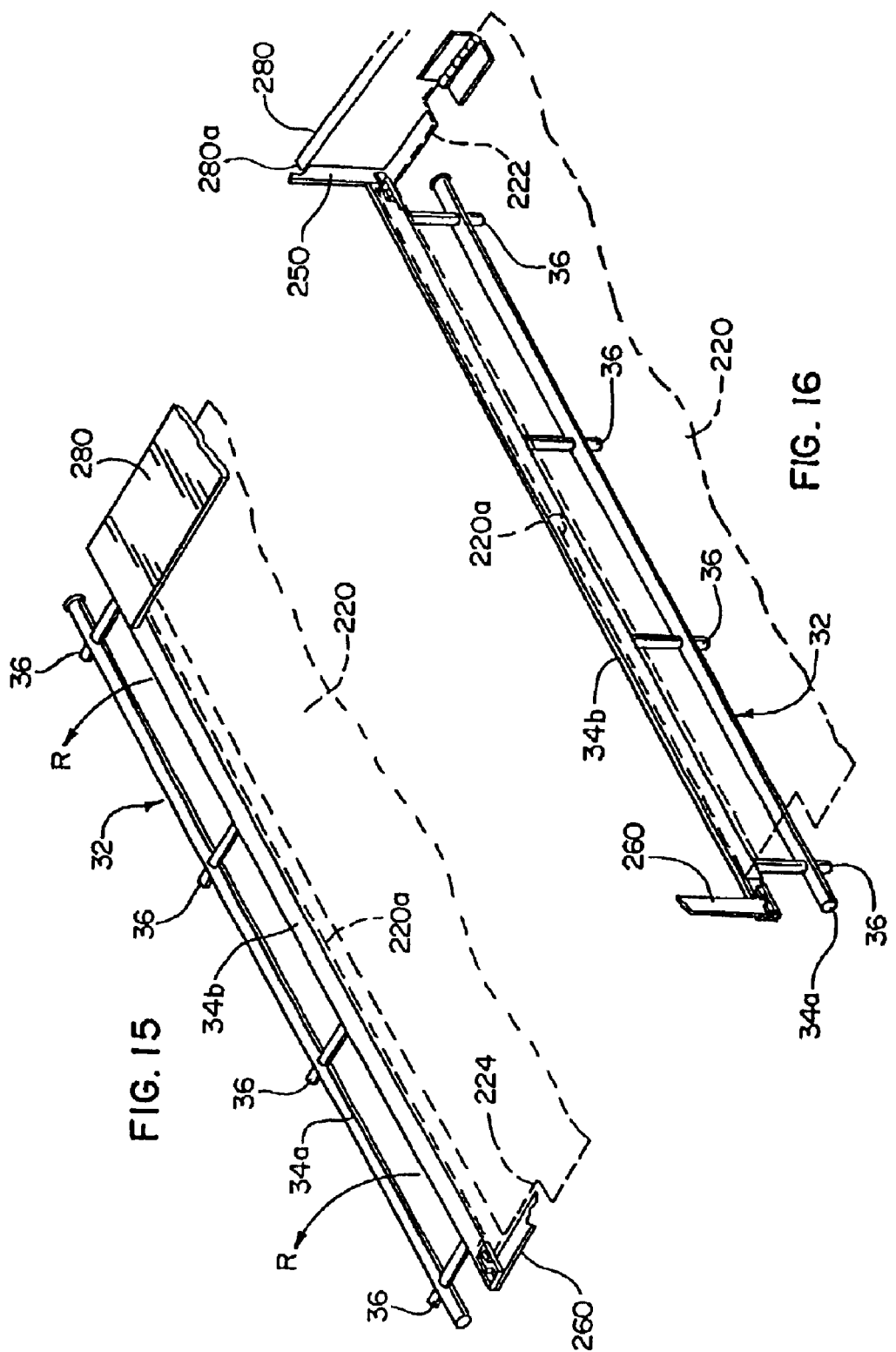

WHEELCHAIR RAMP WITH SIDE BARRIERS

CROSS-REFERENCE TO RELATED APPLICATION

This application claims the benefit of the filing date of Provisional Application No. 60/314,275 filed Aug. 22, 2001.

BACKGROUND OF THE INVENTION

1. Field of the Invention

The present invention relates generally to the field of vehicular access systems, and more particularly to a wheelchair ramp with side barriers.

2. Description of the Related Art

Vehicular wheelchair access systems for handicapped persons, such as lifts and ramps, can be mounted on vehicles and deployable/stowable with respect to the vehicle. Wheelchair users typically must move their wheelchair along lift platforms and ramps in order to transfer from the ground to the vehicle and from the vehicle to the ground. Sidebarriers can be provided along the length of the ramp or lift platform as a safety precaution to prevent a wheelchair from moving or exiting over the sides of the ramp or platform outside the vehicle. Such sidebarriers may be affixed or deployable with the ramp. Examples of wheelchair ramps with side barriers are provided in U.S. Pat. No. 5,393,192 to Hall, et al. for "Underfloor Extendable Ramp for Vehicles" issued Feb. 28, 1995 and U.S. Pat No. 5,676,515 to Haustein for "Low Floor Vehicle Ramp" issued Jun. 3, 1996.

While the prior art recognizes the need for side barriers on wheelchair ramps, there remains room for additional improvements. The present invention is directed to satisfying these needs, among others. Whereas the prior art discloses side barriers fixedly-mounted or deployable with the ramp, several problems are associated with the prior art systems in that low-profiles may only be achieved with fixed barriers where the barrier height is of limited useful dimensions. On the other hand, spring-released barriers may be of limited use where the resilient spring actuation is susceptible to being defeated with obstacles or failure of the spring-actuated mechanism itself. Therefore, it would be desirable to provide a side-barrier actuator for use with the deployment of a substantial side barrier, which may not be defeated in the event that an obstacle holds down the barrier or in the event that the resilient spring member is rendered inoperable.

SUMMARY OF THE INVENTION

The present invention is directed to a vehicular access system which includes a ramp that allows a wheelchair to be transferred between the ground and a vehicle. The ramp has side barriers along each side thereof that are pivotal between a raised safety barrier orientation and a stowed low-profile orientation. The side barriers are spring biased toward their stowed low-profile orientation.

The present invention is directed to a vehicular access system which includes a ramp that allows a wheelchair to be transferred between the ground and a vehicle. The ramp has side barriers along each side thereof that are pivotal between a raised safety barrier orientation and a stowed low-profile orientation. The ramp is deployed with the side barriers in the stowed low-profile orientation, and an actuator pivots each side barrier to the raised safety barrier orientation as the inboard end of the ramp is raised to a vehicle floor level position.

The present invention is directed to a vehicular access system which includes a ramp that allows a wheelchair to be transferred between the ground and a vehicle. The ramp has side barriers along each side thereof that are pivotal between a raised safety barrier orientation and a stowed low-profile orientation. The ramp is deployed with the side barriers in the stowed low-profile orientation, and an actuator is movable into contact with each side barrier to pivot it from the stowed low-profile orientation to the raised safety barrier orientation.

The present invention is directed to a vehicular access system which includes a ramp that allows a wheelchair to be transferred between the ground and a vehicle. The ramp has side barriers along each side thereof that are pivotal between a raised safety barrier orientation and a stowed low-profile orientation. The ramp is deployed with the side barriers in the stowed low-profile orientation, and an actuator contacts each side barrier to pivot it from the stowed low-profile orientation to the raised safety barrier orientation. The actuator remains in contact with its adjacent side barrier to support the side barrier in the raised safety barrier orientation.

The present invention is directed to a vehicular access system which includes a ramp that allows a wheelchair to be transferred between the ground and a vehicle. The ramp has side barriers along each side thereof that are pivotal between a raised safety barrier orientation and a stowed low-profile orientation. The ramp is deployed with the side barriers in the stowed low-profile orientation. An actuator adjacent each side barrier has a first contact portion for initiating pivoting movement of the adjacent side barrier and a second contact portion to maintain contact with the adjacent side barrier as it is moved to and positioned in the raised safety barrier orientation. A rocker assembly is pivotally attached to the ramp. The rocker assembly and actuator are operable with a drive assembly to raise the inboard end of the ramp to the floor level of the vehicle and to pivot the side barrier to the raised safety barrier orientation as the ramp is deployed.

These and further objects, advantages, features, forms, embodiments, and aspects of the present invention will be apparent from the following description of the preferred embodiment.

BRIEF DESCRIPTION OF THE DRAWINGS

FIG. 15 is a partial perspective view of the inboard end of the ramp of the vehicular access system of FIG. 11 with the ramp in the lowered, deployed position and one of the side barriers in the stowed orientation.

FIG. 16 is a partial perspective view of the inboard end of the ramp of the vehicular access system of FIG. 11 with the ramp in the raised, floor level position one of the side barriers in the raised safety barrier orientation.

DESCRIPTION OF THE PREFERRED EMBODIMENT

Figure 1:
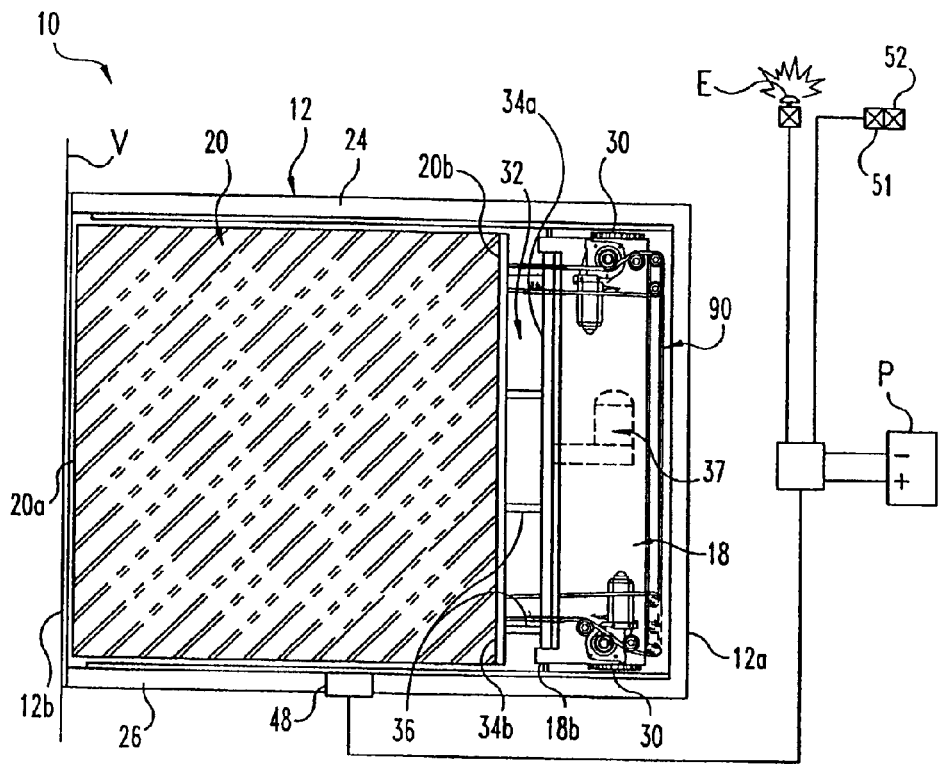
FIG. 1 is a top plan view of a vehicle access system according to the present invention with a ramp in a stowed position along with a control schematic for operation of the same.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any such alterations and further modifications in the illustrated device, and such further applications of the principles of the invention as illustrated herein are contemplated as would normally occur to one skilled in the art to which the invention relates.

Referring now to FIG. 1 there is illustrated a vehicular access system 10 according to the present invention. Access system 10 includes a frame 12 having an inboard end 12a and an opposite outboard end 12b. Frame 12 can be mounted to a vehicle V either below the vehicle floor, or in any other position on the vehicle as would occur to those skilled in the art. A transfer member is movably mounted to the frame and is sized to provide wheelchair access to the vehicle from the ground. In the illustrated embodiment, the transfer member is in the form of a ramp 20 that is moveably mounted in frame 12. While the illustrated embodiment is described herein with reference to ramp 20, it should be understood that principals of the present invention also have application with other types of transfer members, such as a platform for a wheelchair lift.

Access system 10 includes a first drive assembly 14 and a second drive assembly 16 interconnected by a linking member 90. Linking member 90 maintains drive assemblies 14, 16 simultaneously in either an automatic mode or a manual mode for deploying and stowing the transfer member. A locking assembly 100 (FIGS. 8–10) is provided to allow operator selection of the automatic or manual deploy/stow mode. Preferably, locking assembly 100 is engageable to a portion of one of the first drive assembly 14, the second drive assembly 16, or the linking member 90 in order to select the automatic deploy/stow mode and disengaged to select the manual deploy/stow mode. Since linking member 90 connects first drive assembly 14 to second drive assembly 16, locking assembly 100 need only engage a component of the linking member or the drive assemblies to maintain access system 10 in the automatic deploy/stow mode.

Figure 2:
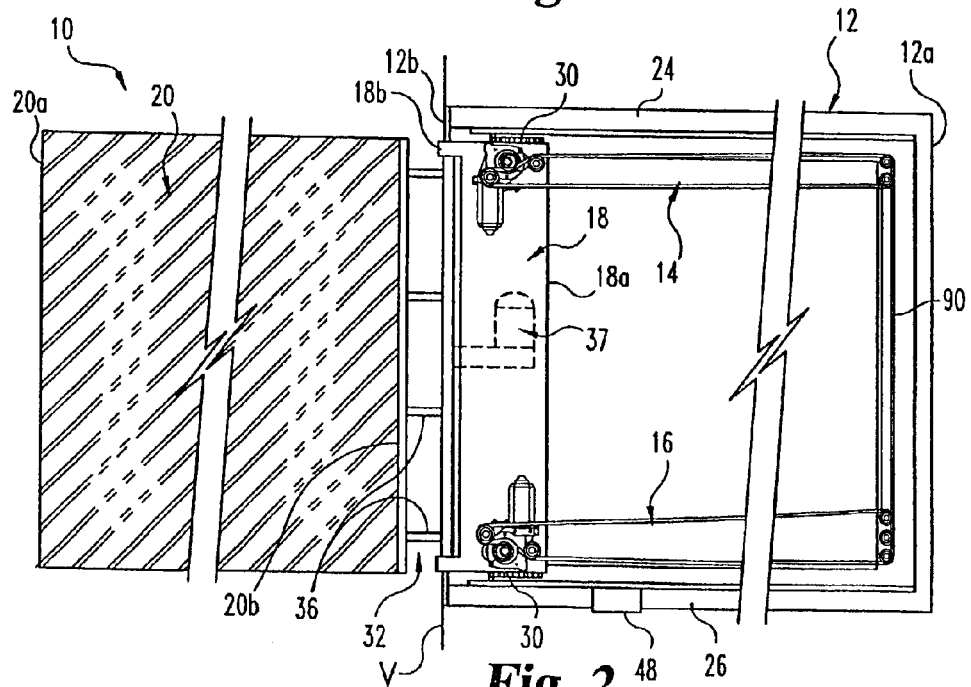
FIG. 2 is a top plan view of the vehicle access system of FIG. 1 with the ramp in a deployed position.

Frame 12 has a first side rail 24 and a second side rail 26 in which wheels 28 of ramp 20 are mounted and movable therealong. Ramp 20 has an inboard end 20a and an opposite outboard end 20b. A carriage 18 has an inboard end 18a and an outboard end 18b. Inboard end 20a of ramp 20 is hingedly attached to outboard end 18b of carriage 18 by a rocker assembly 32. Carriage 18 has carriage wheels 30 on opposite sides thereof movably mounted in side rails 24,26 of frame 12. Ramp 20 and carriage 18 are movable between a stowed position, as shown in FIG. 1, and a deployed position, as shown in FIG. 2, in frame 12 by first drive assembly 14 and second drive assembly 16.

Figure 4:
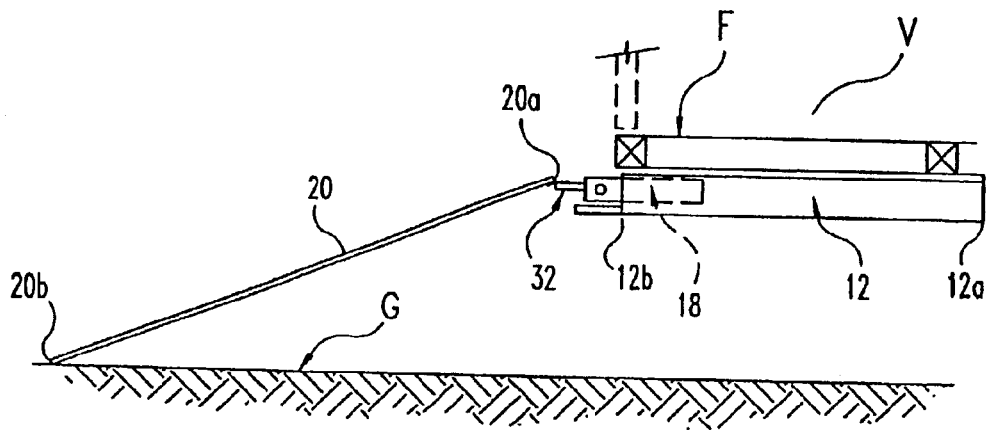
FIG. 4 is a side elevation view of the vehicle access system of FIG. 1 with the ramp fully extended from the vehicle.

Drive assemblies 14 and 16 are powered by a power source P which can be the vehicle or a separate power unit supplied on the vehicle. The ability of the operator to stow and deploy the ramp 20 is controlled by switches S1 and S2 which are operatively connected to drive assemblies 14, 16. An emergency stop E can also be provided in order to stop deployment or stowing of ramp 20. Power unit P, deploy and stow switches S1, S2 and control switch E can provide signals to a control module 48 through hardwired connections or radio frequency transmission. As shown in FIG. 4, control module 48 is connected to a power cable 46 which electrically couple first drive assembly 14, second drive assembly 16, and also to a lifting mechanism 37. Power cable 46 is preferably flexible so it travels along with ramp 20 as it moves inboard and outboard from vehicle V without kinking or binding. Contact sensors or the like can be provided at the inboard and outboard ends of frame 12 in order to sequence the operation of the drive assemblies 14, 16 and lifting mechanism 37 during deployment and stowing of ramp 20, and also to automatically stop movement of ramp 20 when it is fully deployed or completely stowed.

Figure 3:
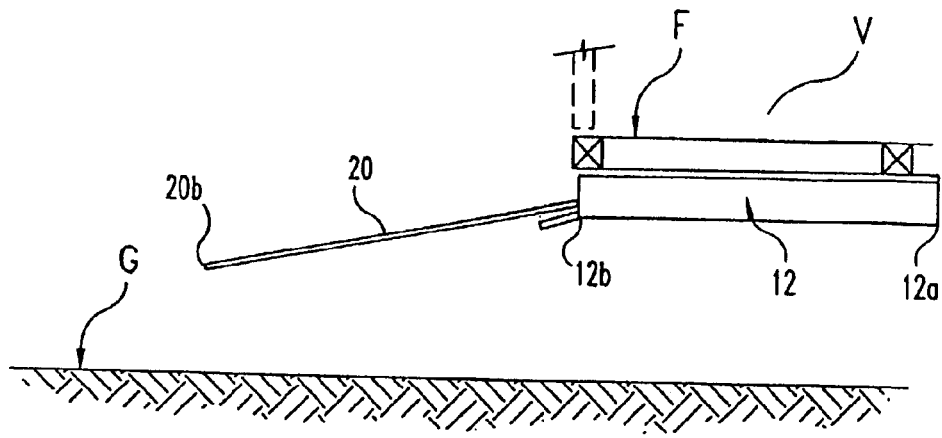
FIG. 3 is a side elevation view of the vehicle access system of FIG. 1 with the ramp partially extended from the vehicle.
Figure 5:
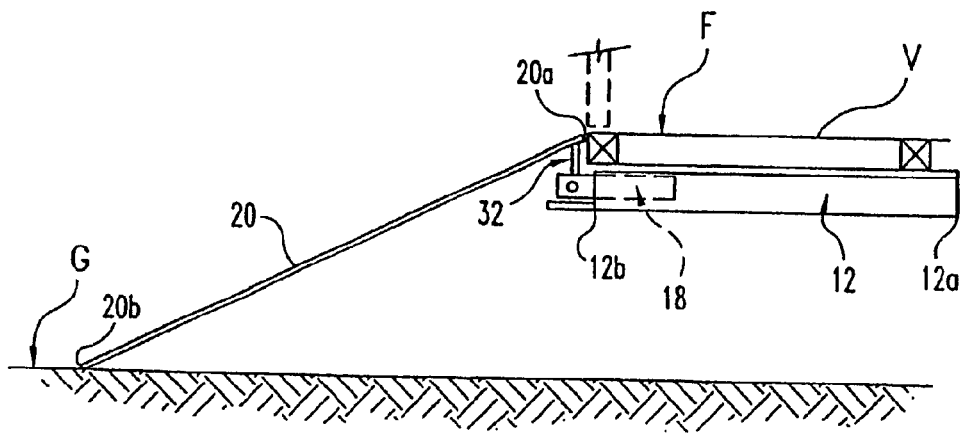
FIG. 5 is a side elevation view of the vehicle access system of FIG. 1 with the ramp fully extended from the vehicle and the inboard end of the ramp raised to the floor elevation of the vehicle.

Referring now further to FIGS. 3–5, deploying and stowing of ramp 20 will be further described. In FIG. 3, ramp 20 is partially deployed from vehicle V. Rocker assembly 32 extends between and is pivotally attached to inboard end 20a of ramp 20 and outboard end 18b of carriage 18. Rocker assembly 32 includes a first rocker shaft 34a rotatably connected to the outboard end 18b of carriage 18 and a second rocker shaft 34b rotatably connected to the inboard end 20a of ramp 20. Rocker shafts 34a, 34b are interconnected by a number of struts 36 extending therebetween. The length of each strut 36 is preferably adjustable to accommodate differing elevations between vehicle V and frame 12. When ramp 20 has been fully extended from the vehicle Vas shown in FIG. 4, outboard end 20b of ramp 20 is on or near ground a. Lifting mechanism 37 is operable to pivot rocker assembly 32 about outboard end 18b of carriage 18 to thereby raise inboard end 20a of ramp 20 to the vehicular floor level F, as shown in FIG. 5. This provides a smooth transition surface for the wheelchair between ground level a and floor level F of vehicle V.

Figure 6:
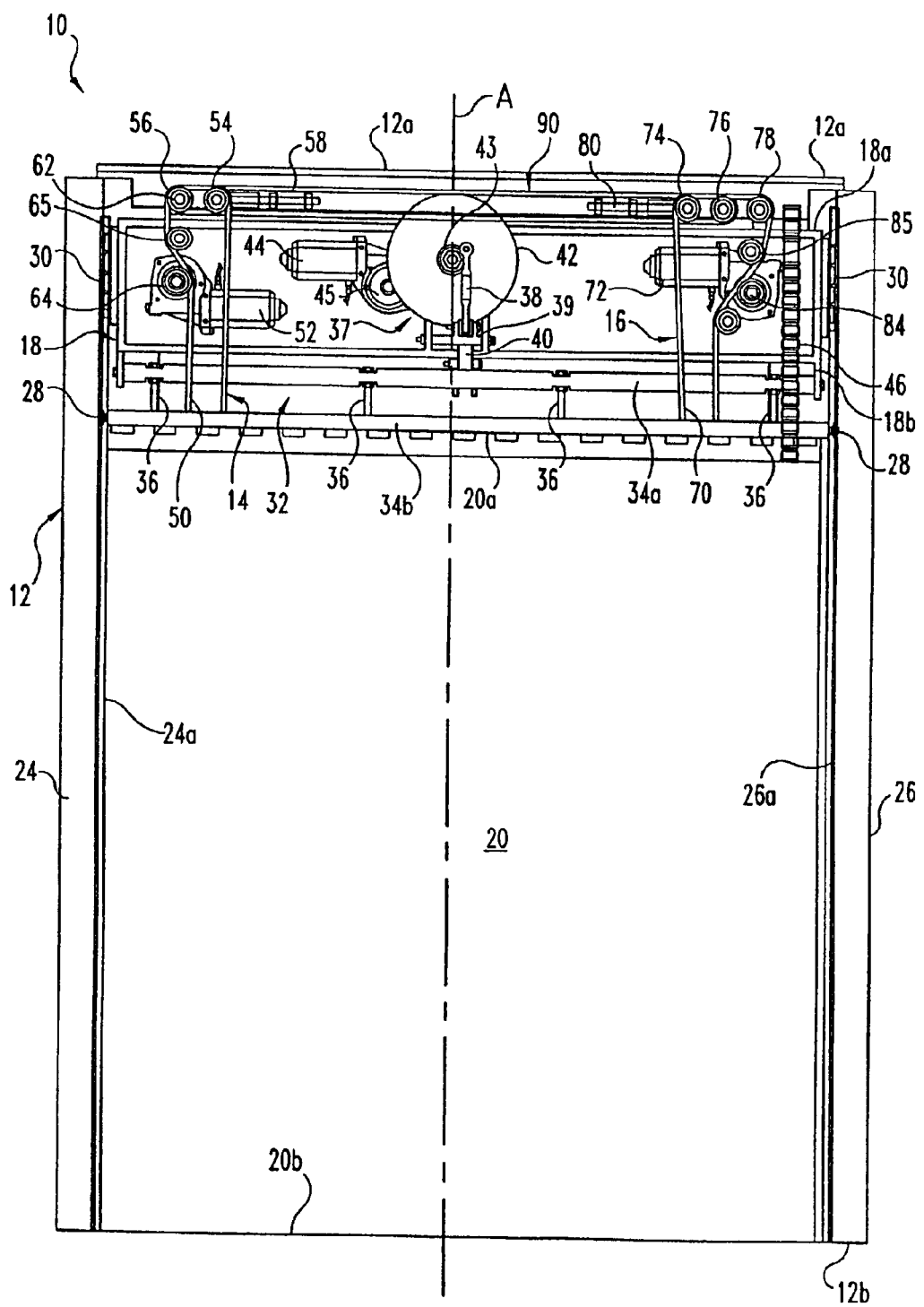
FIG. 6 is an enlarged plan view of the vehicle access system of FIG. 1 with the ramp in the stowed position.
Figure 7:
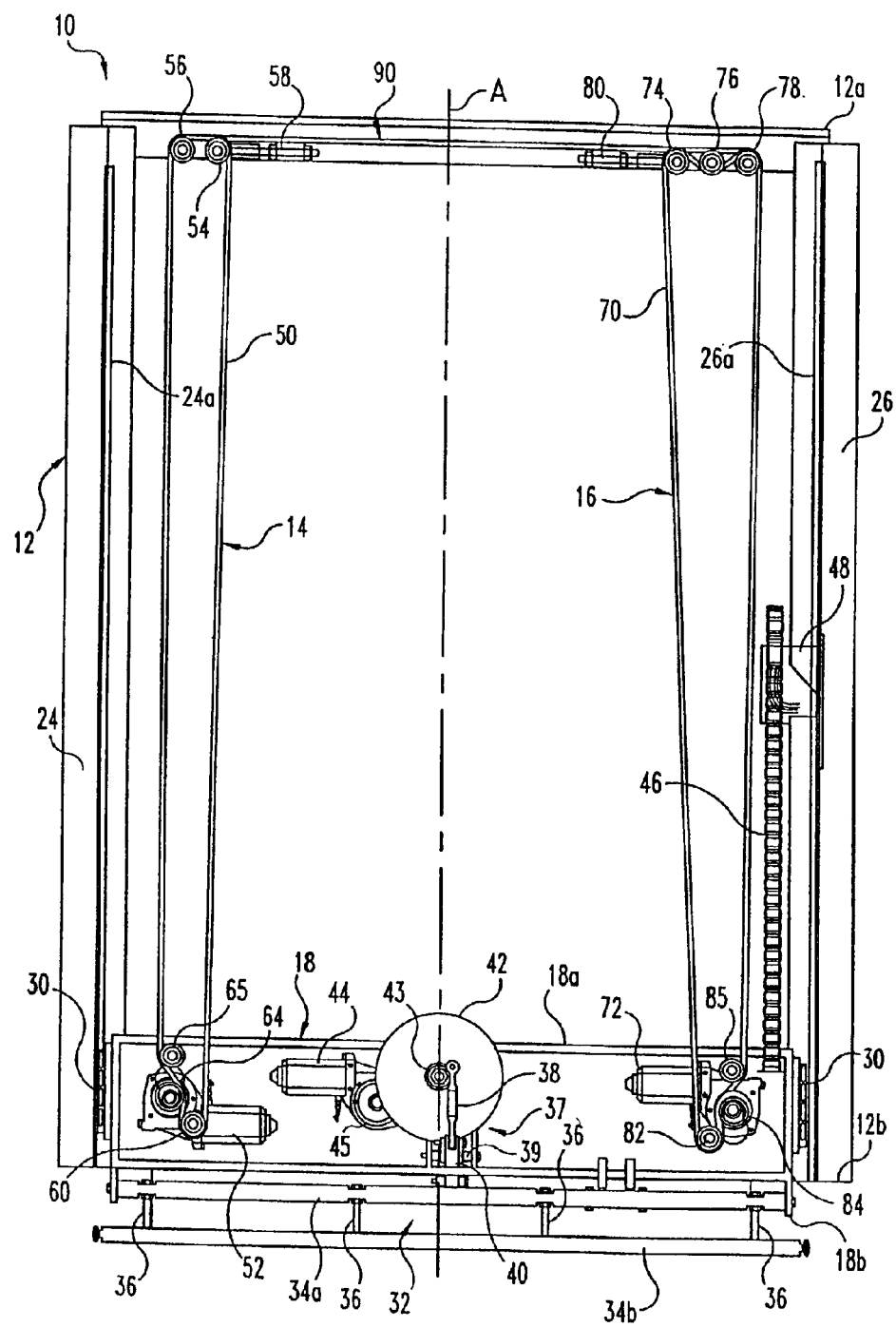
FIG. 7 is the view of FIG. 6 with the ramp removed and the drive assemblies located in the ramp deployed position.

Referring now to FIGS. 6 and 7, further details of lifting mechanism 37 will be described. Lifting mechanism 37 includes a lift motor 44 mounted in carriage 18 operable to rotate a pinion 45 mounted thereon. Pinion 45 is engaged to a lift gear 42. Lift gear 42 is rotatably mounted in carriage 18 and is driven in a clockwise or counterclockwise direction by motor 44 via pinion 45. Lifting mechanism 37 further includes a lift arm 38 that is connected at one end to a hub 43 away from its center. Hub 43 is mounted about the center of lift gear 42 and rotates therewith. A spacer 39 is pivotally mounted to carriage 18. Lift arm 38 is connected at its opposite end to a yoke 40. Yoke 40 is further pivotally connected with spacer 18, which maintains relative positioning between carriage 18 and yoke 40. Yoke 40 extends from its connection with lift arm 38 and spacer 39 to its pivotal connection with the underside of first rocker shaft 34a.

When lift motor 44 is activated to raise inboard end 20a of ramp 20, pinion 45 drives lift gear 42 in a clockwise direction. This in turn rotates hub 43 which moves lift arm 38 towards inboard end 20a of ramp 20. Lift arm 38 drives yoke 40 towards inboard end 20a of ramp 20, thereby causing lower rocker shaft 34a to rotate about outboard end 18b of carriage 18. This in turn rotates struts 36, upper rocker shaft 34b, and inboard end 20a of ramp 20 about lower rocker shaft 34a, pivoting inboard end 20a of ramp 20 about rocker shaft 34a and raising inboard end 20a of ramp 20 from the position shown in FIG. 4 to the floor level F of vehicle V as shown in FIG. 5. Lift motor 44 is reversed to rotate pinion 45 and lift gear 42 in a counterclockwise direction to lower inboard end 20a of ramp 20 form the position of FIG. 5 to the position of FIG. 4.

The drive assemblies 14, 16 and linking member 90 will now be further described with reference to FIGS. 6–9. Side rails 24, 26 of frame 12 preferably include an inwardly facing C-shaped portions 24a, 26a sized to received wheels 28 of ramp 20 and wheels 30 of carriage 18. Carriage 18 and ramp 20, connected to one another by rocker assembly 32, move together along frame 12 in response to driving forces applied by first drive assembly 14 and second drive assembly 16.

First drive assembly 14 includes a first drive motor 52 mounted in carriage 18 and moveable therewith between its stowed and deployed positions. First drive motor 52 includes a drive gear 64. First drive motor 52 is operatively coupled to drive gear 64 to apply a rotary force thereto when powered on. First drive assembly 14 also includes a first drive chain 50 which is engaged by drive gear 64. A tension sprocket 65 is rotatably mounted to carriage 18 and maintains chain 50 in contact with drive gear 64. Chain 50 is looped around a first outboard sprocket 60, a first inboard sprocket 54, and a first double wheeled sprocket 56. First outboard sprocket 60 is rotatably mounted to frame 12 adjacent outboard end 12b. First inboard sprocket 54 and first double sprocket 56 are each rotatably mounted to frame 12 adjacent inboard end 12a. In the illustrated embodiment, double sprocket 56 is positioned between side rail 24 and first inboard sprocket 54. A tension adjuster 58 is secured to first inboard sprocket 54 to maintain chain 50 in a taut condition.

Second drive assembly 16 includes a second drive motor 72 mounted in carriage 18 and moveable therewith between its stowed and deployed positions. Second drive motor 72 includes a drive gear 84. Second drive motor 72 is operatively coupled to drive gear 84 to apply a rotary force thereto when motor 72 is powered on. Second drive assembly 16 also includes a second drive chain 70 which is engaged by drive gear 84. A tension sprocket 85 is rotatably mounted to carriage 18 and maintains chain 70 in contact with drive gear 84. Chain 70 is looped around a second outboard sprocket 82, a second inboard sprocket 74, and a reversing sprocket 78. For reasons explained below, chain 70 extends around the outboard side of a second double wheeled sprocket 76. Second outboard sprocket 82 is rotatably mounted to frame 12 adjacent outboard end 12b. Second inboard sprocket 74, second double sprocket 76, and reversing sprocket 78 are rotatably mounted to frame 12 adjacent inboard end 12a. In the illustrated embodiment, second double sprocket 76 is positioned between second inboard sprocket 74 and side rail 26, and reversing sprocket 78 is positioned between second double sprocket 76 and side rail 26. A tension adjuster 80 is secured to second inboard sprocket 74 to maintain chain 70 in a taut condition.

Linking member 90 interconnects first drive assembly 14 with second drive assembly 16. Preferably, linking member 90 is in the form of a loop chain which is connected around, an upper cog 56b of first double sprocket 56 and around an upper cog 76b of second double sprocket 76. Drive chain 50 is connected around lower cog 56a of double sprocket 56 and also around first inboard sprocket 54 and first outboard sprocket 60, which lie in generally the same horizontal plane as lower cog 56a. Drive chain 70 is connected around lower cog 76a of second double sprocket 76 and also around second inboard sprocket 74, reversing sprocket 78, and second outboard sprocket 82, which lie in generally the same horizontal plane as lower cog 76a. Although other orientations are contemplated, drive chains 50, 70 and linking member 90 are preferably oriented horizontally to allow the overall height of frame 12 to be reduced.

Figure 8:
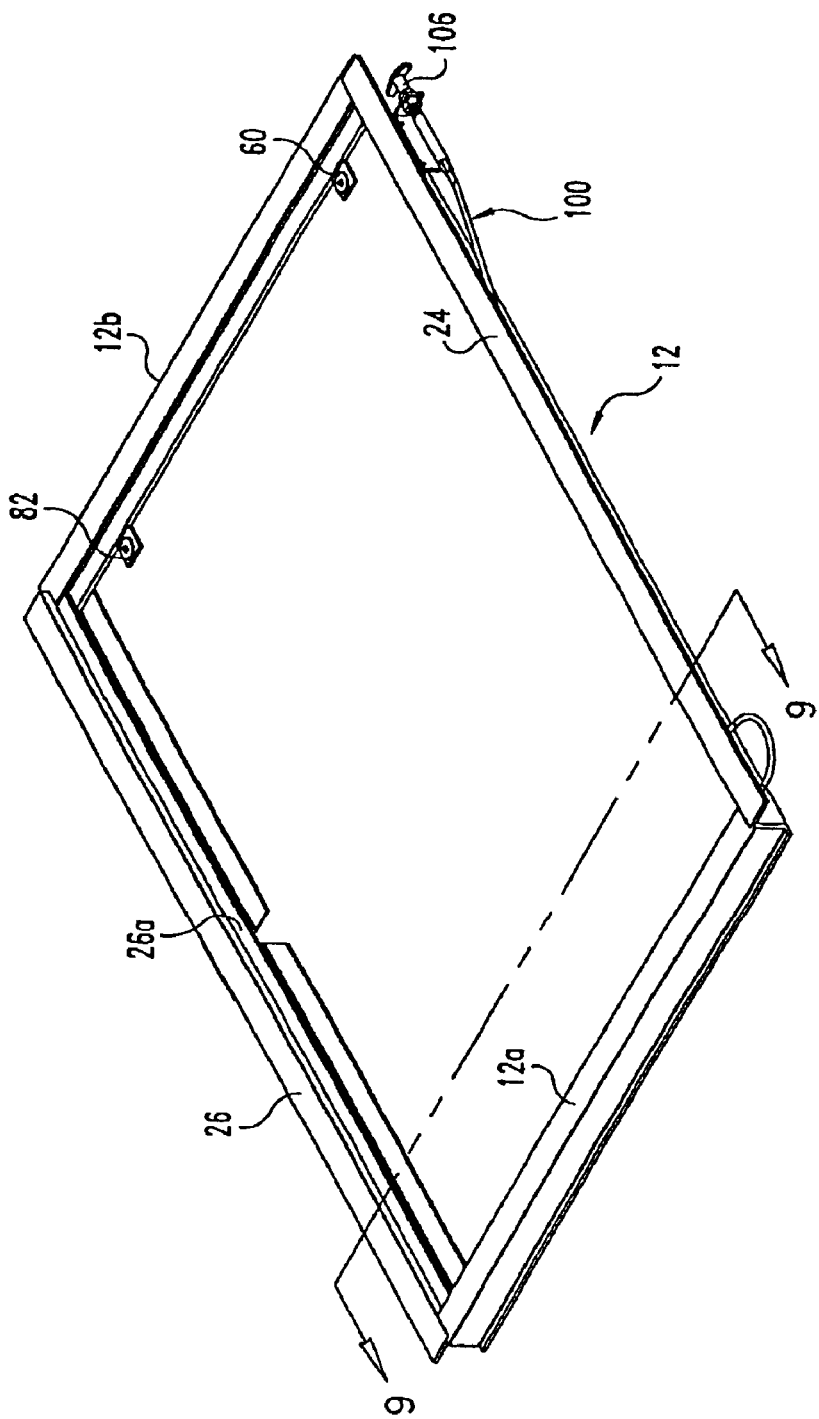
FIG. 8 is a perspective view of the frame of the vehicle access system of FIG. 1 with the ramp, carriage, drive motors and drive chains removed therefrom.
Figure 9:
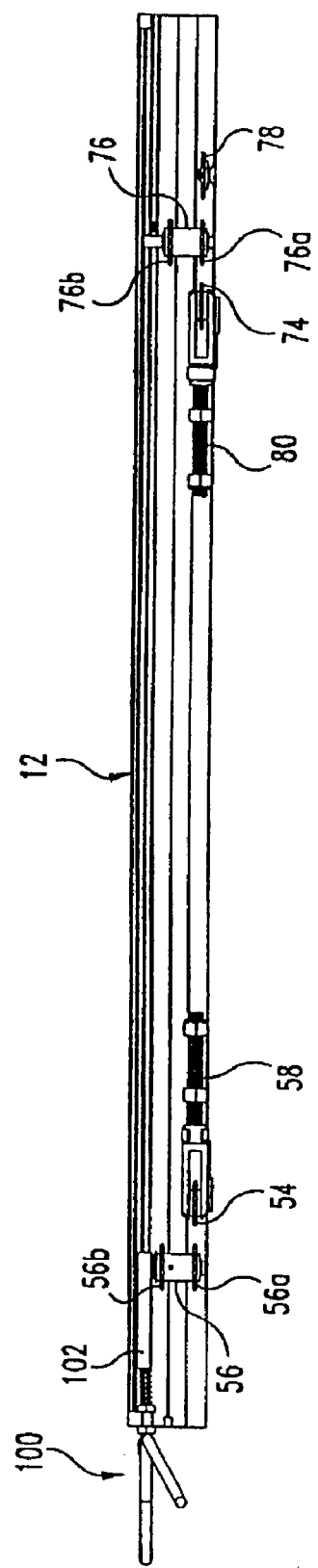
FIG. 9 is a sectional view taken through line 9—9 of FIG. 8.
Figure 10:
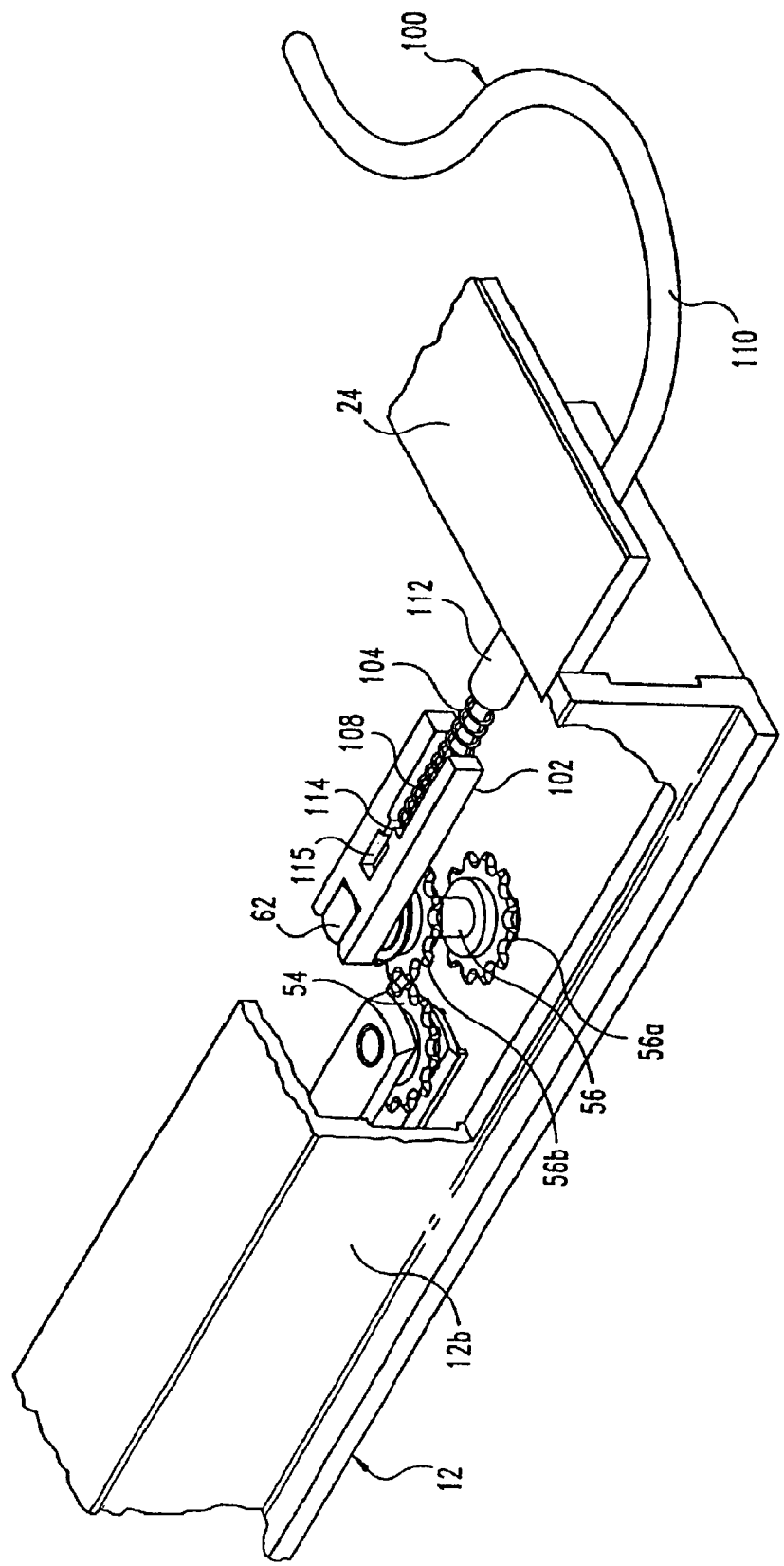
FIG. 10 is an enlarged detailed perspective view of a portion of a locking assembly comprising a portion of the vehicle access system of FIG. 1.

As shown in FIGS. 8–10, locking assembly 100 is engageable to one of the first drive assembly 14, the second drive assembly 16, or linking member 90 to prevent movement of first drive chain 50, second drive chain 70, and linking member 90 relative to one another. In the illustrated embodiment, locking assembly 100 includes a locking member 102 secured to frame 12 at inboard end 12a and movable with respect thereto. Locking member 102 is spring-biased into locking engagement with a locking hub 62 provided on top of first double sprocket 56 by a spring 108. Spring 108 extends between and is contact at one end with an abutment member 112 adjacent side rail 24. At its opposite end, spring 108 is in contact with a slotted wall 114 of locking member 102. Locking member 102 is further coupled to a control cable 104. Control cable 104 is captured at one end in a cavity 115 of locking member 102 against slotted wall 114. Cable 104 extends through the slotted wall 114, spring 108, abutment member 112, side rail 24. As it exits side rail 24, cable 104 is surrounded by an outer sleeve 110 and is coupled to a handle 106 at its opposite end. Handle 106 is preferably positioned near outboard end 12b of frame 12 for easy access by the operator of access system 10.

Locking member 102 is released from locking hub 62 by pulling on handle 106, thereby retracting cable 104 and locking member 102 in the direction of arrow R, thereby compressing spring 108. Handle 106 preferably includes a catch or the like that can be engaged by rotating handle 106 when locking member 102 is disengaged, allowing locking member to be maintained in the disengaged position for manual deploying and stowing of ramp 20.

When locking hub 62 is engaged as shown in FIG. 10, movement of first drive chain 50 is not possible since first double sprocket 56 is locked. Movement of second drive chain 70 is also not possible since linking member 90 interconnects second double sprocket 76 with first double sprocket 56. This permits first drive motor 52 and second drive motor 72 to travel along its respective fixed drive chain 50,70. When locking member 102 is disengaged from locking hub 62, drive chains 50 and 70 and linking number 90 are free to rotate about their respective sprocket wheels. The relative movement between drive chains 50, 70 is coordinated by linking member 90. This allows manual movement of ramp 20 between the deployed and stowed positions. Reversing sprocket 78 is provided to so that linking member is free to rotate about double sprockets 56, 76 and reverse the direction of movement of second drive chain 70 with respect to first drive chain 50 when locking assembly 100 is disengaged. This allows ramp 20 to be manually deployed and stowed within frame 12.

Access system 10 has a central axis A centrally positioned between side rails 24, 26 of frame 12 and extending between inboard end 12a and outboard end 12b. First drive assembly 14 and second drive assembly 16 are on opposite sides of axis A and are preferably spaced generally the same distance from axis A. This provides a concentric driving force to ramp 20 to prevent ramp 20 from becoming misaligned or otherwise twisted in frame 12 as it is moved between the stowed and deployed positions. When locking assembly 100 is disengaged, linking member 90 is free to rotate about double sprockets 56, 76, thereby coordinating the movement between first drive chain 50 and second drive chain 70, which are also coupled to double sprockets 56, 76. Linking member 90 ensures that ramp 20 will thus move an equal distance along each drive chain 50, 70 during manual stowing and deployment. Furthermore, when locking assembly 100 is engaged, linking member 90 ensures that both drive chains 50, 70 will not be able to rotate, and each drive assembly 14, 16 will be moving along a fixed chain. Furthermore, it is contemplated that if one of the drive motors 44, 72 were to become inoperable, its respective drive gear could be designed to freewheel along the fixed chain while the operable motor deploys and stows ramp 20. This provides access system 10 with a redundant system for automatically driving the ramp between its stowed and deployed positions.

With reference to FIGS. 11–17 there will be described another aspect of the invention directed to a wheelchair ramp having side barriers. While the side barriers are described with reference to a vehicular access system like that of FIGS. 1–10, it should be understood that the principles associated with the side barriers of the present invention have application with other types of vehicular access systems for wheelchairs, including ramps and lifts. In FIGS. 11–17 there is illustrated vehicular access system 210 that, except as described below, is identical to vehicle access system 10 described above. As such, elements in FIGS. 11–17 identical to a corresponding element in FIGS. 1–10 are designated with the same reference numeral.

Referring now to FIGS. 11–14, access system 210 includes a ramp 220 extending between an inboard end 220a and an outboard end 220b. A first side barrier 280 extends along a first lateral edge of ramp 220 and a second side barrier 290 extends along a second lateral edge of ramp 220. Side barrier 280 has an inboard end 280a co-extensive with inboard end 220a of ramp 220 and an opposite outboard end 280b co-extensive with outboard end 220b of ramp 220. Similarly, side barrier 290 has an inboard end 290a co-extensive with inboard end 220a of ramp 220 and an opposite outboard end 290b co-extensive with outboard end 220b of ramp 220.

Figure 11:
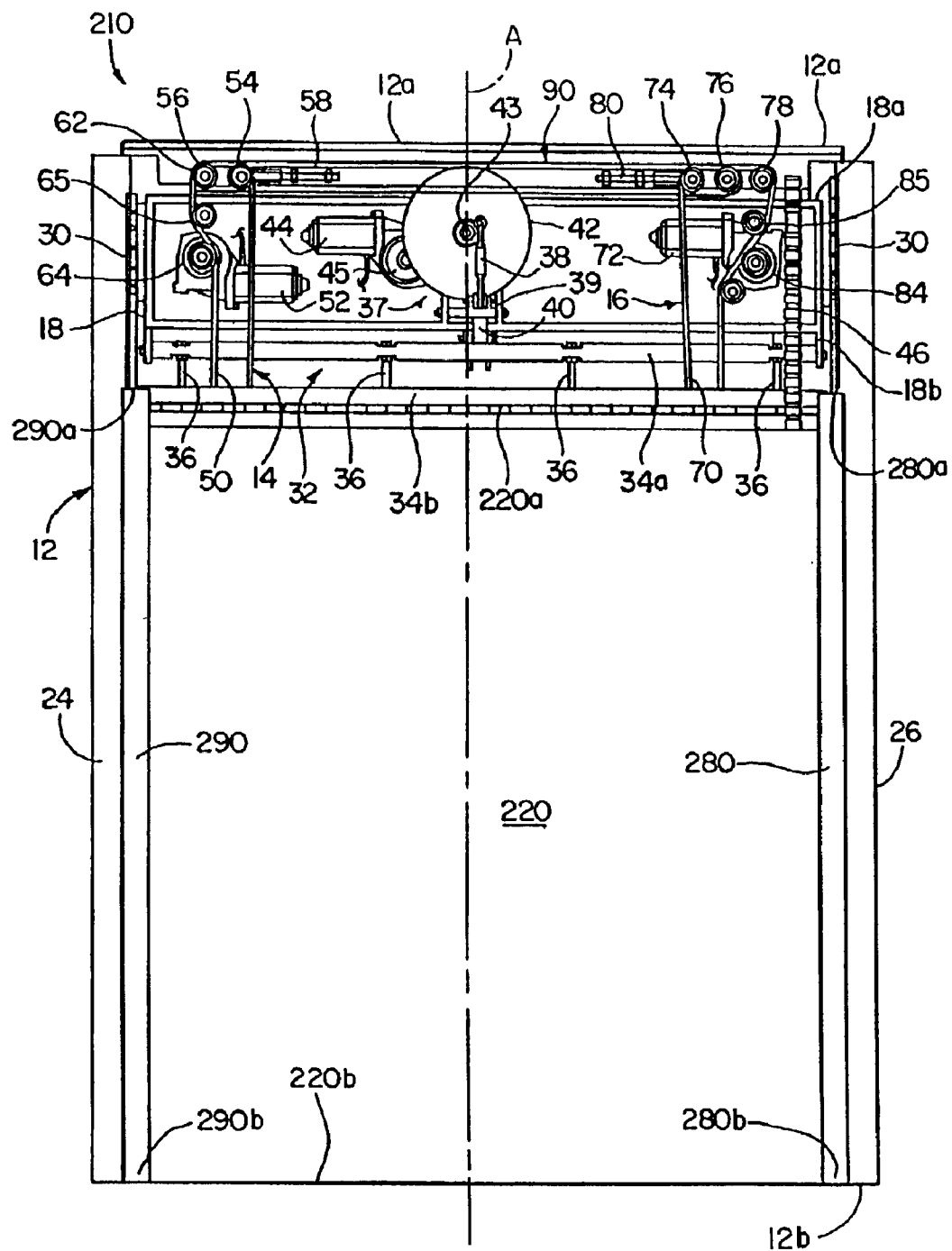
FIG. 11 is an enlarged plan view of another vehicular access system having a ramp and side barriers depicted with the ramp and side barriers in a stowed position in a frame.

In FIG. 11 ramp 220 is in its stowed position within side rails 24, 26 of frame 12 and side barriers 280, 290 are in their stowed orientation to form a low-profile arrangement that allows the ramp and side barriers to fit in frame 12 beneath the floor of the vehicle. Advantageously, the described embodiment contemplates the use of side barriers 280/290, which are of substantial height, e.g., two inches or greater, to ensure safe deployment and use in a low-profile arrangement. It is contemplated that side barriers 280, 290 are pivotally coupled along their respective lateral edge of ramp 220 with a spring hinge that biases the side barriers to their stowed orientation.

Figure 12:
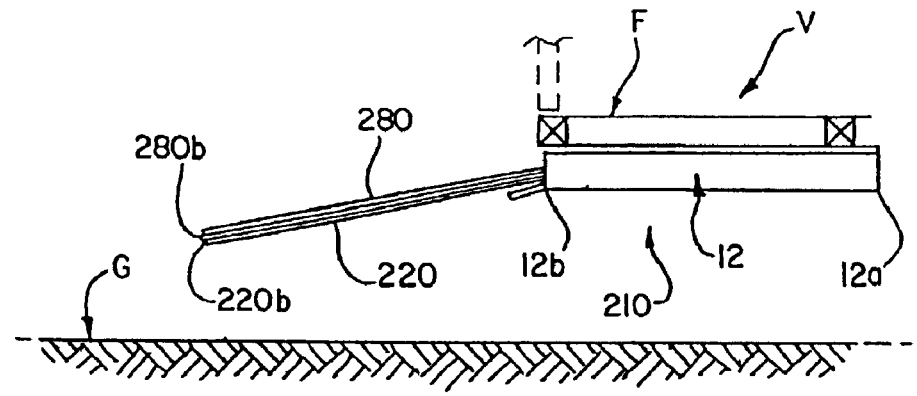
FIG. 12 is a side elevation view of the vehicular access system of FIG. 11 with the ramp partially extended from the vehicle and side barriers in the stowed orientation.
Figure 13:
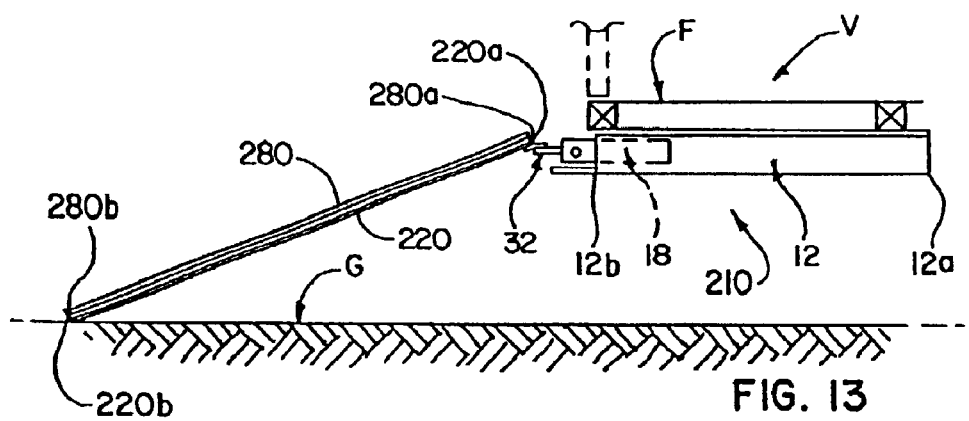
FIG. 13 is a side elevation view of the vehicular access system of FIG. 11 with the ramp fully extended from the vehicle and the side barriers in the stowed orientation.
Figure 14:
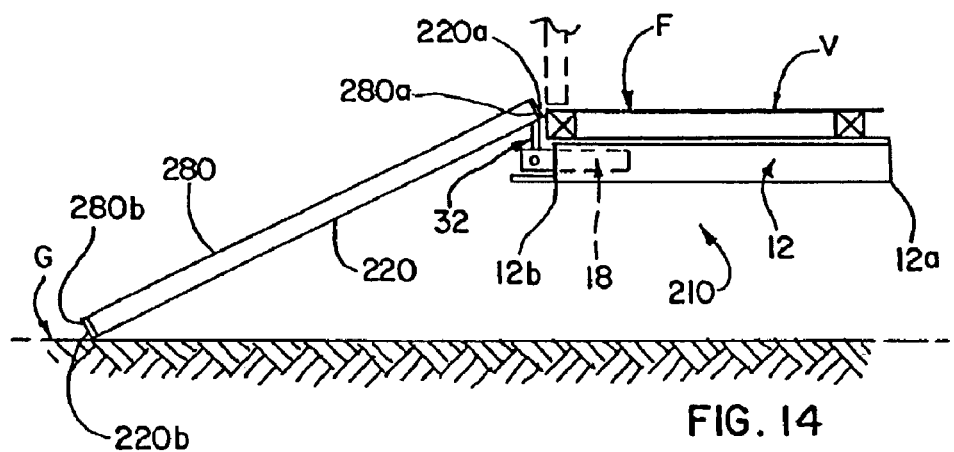
FIG. 14 is a side elevation view of the vehicular access system of FIG. 11 with the ramp fully extended from the vehicle, the inboard end of the ramp raised to the floor elevation of the vehicle, and the side barriers in the raised safety barrier orientation.

In FIG. 12 ramp 220 is partially deployed from vehicle V, and first side barrier 280 and second side barrier (not shown) remain in their stowed orientation as ramp 220 is extended from frame 12. In FIG. 13, ramp 220 is completely deployed from vehicle V and side barriers 280, 290 remain in their stowed orientations. In FIG. 14, inboard end 220a of ramp 220 is raised to floor level F of vehicle V by rocker assembly 32 as discussed above. As described further below, actuators coupled to rocker assembly 32 contact respective ones of the side barriers 280, 290 as inboard end 220a is raised to the floor level position, pivoting side barriers 280, 290 to their raised safety barrier orientation with respect to ramp 220 as shown in FIG. 14. When inboard end 220a is lowered with rocker assembly 32, side barriers 280, 290 are spring biased to return toward their stowed orientation shown in FIGS. 11, 12 and 13.

Referring now to FIGS. 15 and 16, there is shown partial perspective views of rocker assembly 32 and a portion of ramp 220 connected therewith. Ramp 220 is shown in outline form in hidden lines so as to not obstruct the view of rocker assembly 32. In FIG. 15, rocker assembly 32 and ramp 220 are oriented with respect to one another such that inboard end 220a of ramp 220 is not raised to floor level F; i.e. ramp 220 is in the positions of FIGS. 11, 12 and 13. Rocker assembly 32 and ramp 220 are rotated in the direction of arrows R to arrive at the ramp/rocker assembly orientation of FIG. 16, wherein inboard end 220a is raised to floor level F, as shown in FIG. 13.

Second rocker shaft 34b has a first actuator 250 coupled to and extending laterally from one end thereof, and a second actuator 260 coupled to and extending laterally the other end thereof. First actuator 250 and second actuator 260 can be fixedly coupled to second rocker shaft 34b and move along therewith as second rocker shaft 34b is raised from its position of FIG. 15 to its position of FIG. 16 by lifting mechanism 37. As such, actuators 250, 260 extend generally parallel to or in generally the same plane as ramp 220 when ramp 220 is in its non-raised position of FIG. 15. When ramp 220 is raised to its FIG. 16 position, actuators 250, 260 follow the rotational movement of second rocker shaft 34b about first rocker shaft 34a and are thus oriented transversely to ramp 220.

In FIG. 15, first side barrier 280 is in its stowed orientation and pivoted alongside the upper surface of platform 220 over first actuator 250 (not shown). Second side barrier 290 is removed so second actuator 260 can be shown in its stowed orientation. Ramp 220 includes a recess or cutout 224 in a corner thereof extending partially or completely through ramp 220. Cutout 224 is sized to receive second actuator 260 therein so that second actuator 260 is recess below the upper surface of ramp 220 when in its stowed orientation. Similarly, first actuator 250 is positioned in cutout 222 of ramp 220 when in its stowed orientation. With actuators 250, 260 recessed at or below the upper surface of ramp 220, side barriers 280, 290 can be positioned adjacent to or in contact with the upper surface of ramp 220. Thus, ramp 220 and side barriers 280, 290 can assume a lower profile for stowage in frame 12 than would be possible if actuators 250, 260 were located between side barriers 280, 290 and ramp 220 when side barriers 280, 290 were in their stowed orientation.

In FIG. 16, rocker assembly 32 is rotated by lift mechanism 37 to raise inboard end 220a of ramp 220 to the vehicle floor level. Actuators 250, 260 are rotated along with second rocker shaft 34b from their stowed orientation in cutouts 222, 224 and into contact with the adjacent side barrier 280, 290. As actuators 250, 260 are rotated to their vertical orientation, side barriers 280, 290 are pivoted about their hinged connection 270 with ramp 220 from their stowed orientation to a raised safety barrier orientation in which side barriers 280, 290 are generally vertically and transversely oriented with respect to ramp 220, as shown by side barrier 280. It is contemplated that each actuator 250, 260 remains in contact with its adjacent side barrier 280, 290 to maintain it in the raised safety barrier orientation and resist its normally spring-bias return toward its stowed orientation. A number of hinged connections 270 along each side barrier are also contemplated.

Referring now to FIGS. 17a–17d, actuators 250, 260 will be further described with reference to actuator 260, it being understood that actuator 250 is mirror image of actuator 260. Actuator 260 includes a first contact portion 262 located towards the center of ramp 220, and a second contact portion 264. Second contact portion 264 is located adjacent the pivotal connection between side barrier 290 and ramp 220. Side barrier 290 has a height L1 above ramp 220. In the illustrated embodiment, second contact portion 264 has a height above ramp 220 that is substantially the same as side barrier 290.

First contact portion 262 has a height L2 above ramp 220 that is greater than height L1. This allows first contact portion 262 to contact side barrier 290 before second contact portion 264 when actuator 260 is rotated with second rocker shaft 34b. Further, by offsetting first contact portion 262 toward the center of ramp 220, first contact portion 262 contacts side barrier 290 at a location spaced from its pivotal connection with ramp 220, thus creating a greater moment about the pivotal connection between side barrier 290 and ramp 220 than does second contact portion 264.

Figure 17A:
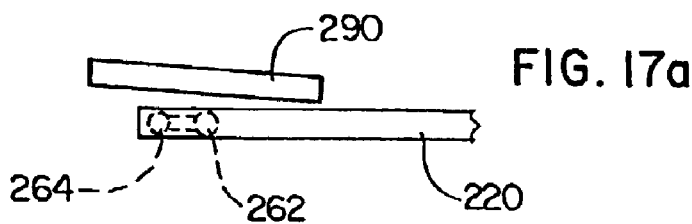
FIGS. 17a–17d illustrate the orientation between the ramp and the side barrier in, respectively, a stowed orientation, a first partially pivoted side barrier position, a second partially pivoted side barrier position, and a raised safety barrier orientation.
Figure 17B:
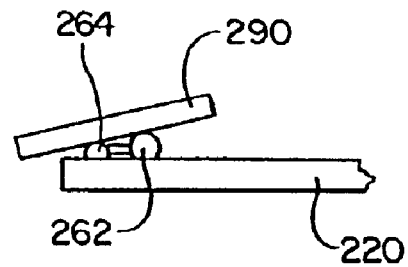
Figure 17C:
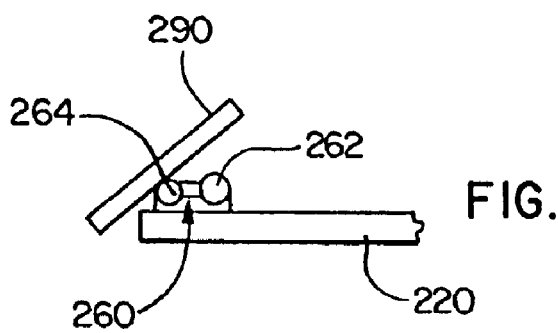
Figure 17D:
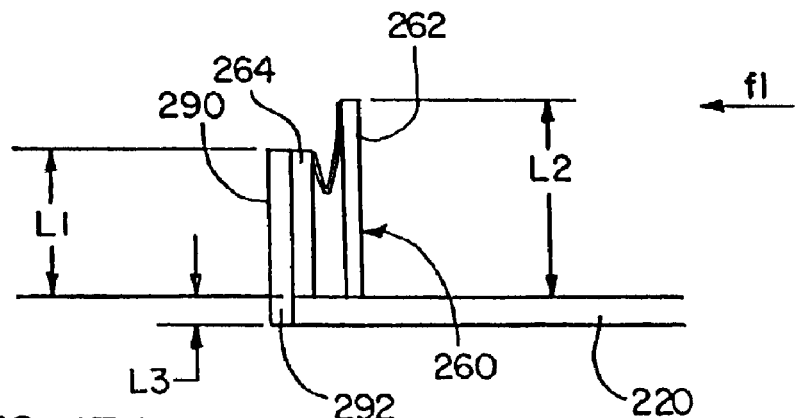

As shown in FIG. 17a, actuator 260 is recessed below the upper surface of ramp 220. In FIG. 17b, raising of inboard end 220a has just been initiated, and the pivoting of rocker shaft 34b brings first contact portion 262 into contact with side barrier 290. The length and positioning of first contact portion 262, as discussed above, generates sufficient force to overcome the spring bias of side barrier 290 toward its stowed orientation and to initiate pivoting movement of side barrier 290 toward its raised safety barrier orientation. In FIG. 17c, side barrier 290 has been further pivoted toward its raised safety barrier orientation, and first contact portion 262 is no longer in contact therewith. Pivoting movement of side barrier 290 is further effected only by second contact portion 264, which thereafter remains in contact with side barrier 290 to maintain it in its raised safety barrier orientation, as shown in FIG. 17d. Actuators 250, 260 are preferably smooth and rounded to facilitate the sliding movement of the side barriers therearound.

Further shown in FIG. 17d, side barrier 290 has an overlap portion 292 that extends alongside ramp 220. This overlap 292 has a length L3 that corresponds to the thickness of ramp 220, and it is contemplated that overlap 292 can be in abutting contact with ramp 220 when side barrier 290 is in its raised safety barrier orientation. If a force indicated by arrow F1 were to contact side barrier 290, contact between overlap 292 and ramp 220 would assist the hinges or other pivotal connectors coupling side barrier 290 to ramp 220 in resisting counterclockwise rotation of side barrier 290. It should be understood that side barrier 280 can be similarly configured.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the actuator can include a cam surface that is received in a cam path formed in the side barrier. The cam surface and cam path are configured so that the cam surface moves along the cam path as the inboard end of the platform is raised in order to move the side barrier from its stowed orientation to its raised safety barrier orientation.

What is claimed is:

1. A vehicular access system, comprising:
   a frame positionable below the floor level of a vehicle;
   a carriage moveably mounted at the frame;
   a transfer member having an inboard end, an opposite outboard end, a first lateral edge end a second lateral edge;
   a rocker assembly pivotably attaching the transfer member to the carriage;
   a drive assembly for deploying and stowing the transfer member from the frame;
   an actuator,
   a side barrier pivotably mounted along the first lateral edge of the transfer member moveable with the actuator between a raised safely barrier orientation and
   a stowed low-profile orientation;
   said rocker assembly being operable with the drive assembly for raising the inboard end of the transfer member to the floor level of the vehicle and for pivoting the side barrier to the raised safety barrier orientation from the stowed low-profile orientation, the barrier being spring biased toward the stowed low-profile orientation to resist the rocker assembly as the transfer member is deployed.

2. An access system as recited in claim 1, wherein said actuator pivots the side barrier to the raised safety barrier orientation as the inboard end of the transfer member is raised to the floor level of the vehicle.

3. An access system as recited in claim 1, wherein said actuator is moveable into contact with the side barrier to pivot the side barrier from the stowed, low-profile orientation to the raised safety barrier orientation.

4. An access system as recited in claim 3, wherein said actuator remains in contact with the side barrier to support the side barrier in the raised safety barrier orientation.

5. An access system as recited in claim 1, wherein said actuator comprises a first contact portion for initiating pivoting movement of the side barrier, and a second contact portion to maintain contact with the side barrier as the side barrier is moved to and positioned in the raised safety barrier orientation.

6. An access system as recited in claim 1, comprising a lifting mechanism operable to pivot the rocker assembly at the carriage to raise the inboard end of the transfer member to the floor level of the vehicle.

7. An access system as recited in claim 1, wherein said rocker assembly comprises a rocker shaft having said actuator coupled thereto and extending from the rocker assembly to move with the rocker assembly.

8. An access system as recited in claim 1, wherein said drive assembly comprises at least one motor operable with the carriage for deploying and stowing the transfer member from the frame.

9. An access system as recited in claim 1, wherein said lifting mechanism comprises a second motor.

10. An access system as recited in claim 1, wherein said transfer member comprises a ramp that is moveably mounted in the frame.

11. An access system as recited in claim 10, comprising a second side barrier pivotably mounted along the second lateral edge of the ramp, and comprising a second actuator operable with the rocker assembly for moving the second side barrier between a raised safety barrier orientation and a stowed, low-profile orientation.

12. A vehicular access method, comprising:
positioning a frame below the floor level of a vehicle;
moveably mounting a carriage at the frame;
providing a ramp having an inboard and an opposite outboard end, a first lateral edge and a second lateral edge moveably mounted in the frame;
pivotally coupling the ramp to the carriage via a rocker assembly;
spring biasing a side barrier pivotally mounted along the first lateral edge of the ramp moveable from the side barrier biased stowed low-profile orientation, to a raised safety barrier orientation when stowing and deploying the ramp from the frame respectively; and
operating the rocker assembly for raising the inboard end of the ramp to the floor level of the vehicle and for pivoting the side barrier to the raised safety barrier orientation as the ramp is deployed.

13. A method as recited in claim 12, comprising providing an actuator for pivoting the side barrier to the raised safety barrier orientation.

14. A method as recited in claim 13, wherein the actuator is provided as being moveable into contact with the side barrier to pivot the side barrier from the stowed, low-profile orientation to the raised safety barrier orientation.

15. A method as recited in claim 14, comprising contacting the side barrier with the actuator to support the side barrier in the raised safety barrier orientation.

16. A vehicular access system, comprising:
means for positioning a frame below the floor level of a vehicle;
means for moveably mounting a carriage at the frame;
means for providing a ramp having an inboard and an opposite outboard end, a first lateral edge and a second lateral edge moveably mounted in the frame;
means for pivotably coupling the ramp to the carriage; and
means operable with said means for pivoting the ramp for raising the inboard end of the ramp to the floor level of the vehicle and for pivoting the side barrier to the raised safety barrier orientation from the stowed low-profile orientation, the barrier being spring biased toward the stowed low-profile orientation to resist the means operable with said means for pivoting as the ramp is deployed.

17. A system as recited in claim 16, comprising an actuator for pivoting the side barrier between a raised safety barrier orientation and the stowed low-profile orientation.

18. A system as recited in claim 17, wherein the actuator is provided with the means for pivotably coupling the ramp as being moveable into contact with the side barrier to pivot the side barrier.

19. A system as recited in claim 16, wherein said means for pivotably coupling the ramp attaching comprises a rocker assembly to raise the inboard and of the transfer member to the floor level of the vehicle.

20. A system as recited in claim 19, wherein the raising means comprises a lifting mechanism operable to pivot the rocker assembly for raising the inboard end of the ramp to the floor level of the vehicle and for pivoting the side barrier to the raised safety barrier orientation as the ramp is deployed.

* * * * *